United States Patent
Agazzi

(10) Patent No.: US 9,527,702 B2
(45) Date of Patent: Dec. 27, 2016

(54) HOIST PULL-LIMITING DEVICE

(71) Applicant: NEXT HYDRAULICS S.r.l., Boretto (RE) (IT)

(72) Inventor: Stello Agazzi, Poviglio (IT)

(73) Assignee: NEXT HYDRAULICS S.R.L., Boretto (RE) (IT)

( * ) Notice: Subject to any disclaimer, the term of this patent is extended or adjusted under 35 U.S.C. 154(b) by 99 days.

(21) Appl. No.: 14/261,796

(22) Filed: Apr. 25, 2014

(65) Prior Publication Data

US 2014/0319308 A1    Oct. 30, 2014

(30) Foreign Application Priority Data

Apr. 30, 2013    (IT) .............................. MI20130167 U

(51) Int. Cl.
| | | |
|---|---|---|
| *B66D 1/58* | (2006.01) | |
| *B66D 1/36* | (2006.01) | |
| *B66D 1/38* | (2006.01) | |
| *B66C 23/88* | (2006.01) | |
| *F16M 13/02* | (2006.01) | |

(52) U.S. Cl.
CPC ................ *B66D 1/58* (2013.01); *B66C 23/88* (2013.01); *B66D 1/36* (2013.01); *B66D 1/38* (2013.01); *F16M 13/02* (2013.01)

(58) Field of Classification Search
CPC ............... B66D 1/58; B66D 1/00; B66D 1/36; B66D 1/39; B66D 1/38; B66D 2700/023; B66C 23/88; F16M 13/02
USPC ..... 248/542, 543, 324, 327, 340, 332, 330.1
See application file for complete search history.

(56) References Cited

U.S. PATENT DOCUMENTS

| | | | | | |
|---|---|---|---|---|---|
| 1,909,990 | A | * | 5/1933 | Weller ...................... | E05D 3/02 16/273 |
| 1,979,894 | A | * | 11/1934 | Lyons ....................... | E05D 3/02 16/263 |
| 2,615,194 | A | * | 10/1952 | Kreiner ..................... | E05D 7/04 16/237 |
| 2,812,640 | A | * | 11/1957 | Hartley et al. .......... | B63B 35/04 226/195 |
| 3,019,472 | A | * | 2/1962 | Wasmuth .................. | E05D 7/04 16/249 |

(Continued)

FOREIGN PATENT DOCUMENTS

GB          2156763 A       10/1985

*Primary Examiner* — Nkeisha Smith
(74) *Attorney, Agent, or Firm* — King & Schickli, PLLC

(57) ABSTRACT

A hoist (19) pull (P) limiting device (11), comprising: a first bearing element (14) to which the hoist (10) is fastened; a second bearing element (18) fastened to the bearing structure (24) on which the pull strength (P) acting on the hoist (10) is unloaded; a butt hinge (16) connecting the first (14) and the second (18) bearing elements with each other, the hinge (16) axis being substantially perpendicular to the direction wherein, through rope (22) of the hoist (10), the pull (P) acts on the latter, said axis being at a certain distance from the rope (22) leaving the hoist (10) drum; elastic means (20; 20A; 20.1; 20.1A) suitable to oppose the rotation of the first bearing element (14) away from the second bearing element (18) on account of the pull (P); means (28) suitable to detect when the width of the rotation angle (f) of the first bearing element (14) relative to the second bearing element (18) matches the maximum predetermined pull (P), as well as to emit the relevant signal.

20 Claims, 5 Drawing Sheets

(56) References Cited

U.S. PATENT DOCUMENTS

| | | | | |
|---|---|---|---|---|
| 4,362,292 A * | 12/1982 | Rowan | ............... | B66C 17/20 212/274 |
| 5,752,291 A * | 5/1998 | Snyder | ............... | E05D 7/04 16/235 |
| 6,158,086 A * | 12/2000 | De Souza | ............... | E05D 7/04 16/237 |
| 7,798,472 B2 * | 9/2010 | Vankeuren, II | ............... | B66D 3/18 254/278 |

\* cited by examiner

HOIST PULL-LIMITING DEVICE

The present invention relates to a hoist pull-limiting device, which is a device suitable to signal when the pull acting on the hoist rope exceeds a predetermined value, so that the pull action of the hoist itself may be discontinued.

As is known to people skilled in the art, the known hoist pull-limiting devices, whether hydraulically or electrically operated, are rather complex and expensive. These devices are of several kinds, namely:

strain gauge load cell devices, wherein load cells are placed on a bar linking the hoist sides and detect the deformation of the hoist structure when submitted to pull, accordingly generating signals which allow the hoist pull action to be discontinued when said deformation matches a predetermined pull;

slide devices, which allow a controlled shift of the hoist along slides substantially arranged in the direction wherein the pull acts, the shift being a function of the pull and being detected by load cells which, as in the previous case, emit relevant signals used to discontinue the hoist operation;

connecting rod devices, similar to the previous ones, with the exception that the hoist shift is provided by connecting rods instead of slides;

(definitely complex) devices detecting the deformation of the hoist drum when submitted to pull, the deformation being a function of the pull, and accordingly emitting signals as a function of said deformation;

devices providing load cells directly arranged on the pivot of the hook fastened at the free end of the hoist rope and transmitting relevant radio signals when a predetermined pull is attained.

The purpose of the present innovation is to implement a simpler and cheaper pull-limiting device compared to those briefly described above.

The purpose is achieved by the pull-limiting device according to the present innovation, having the features specified in the enclosed claim 1. Other features of the device are highlighted in the dependent claims.

The innovation will be more easily comprehensible based on the following description of an exemplary implementation thereof. In said description, reference will be made to the enclosed drawings, wherein.

Figure 1:
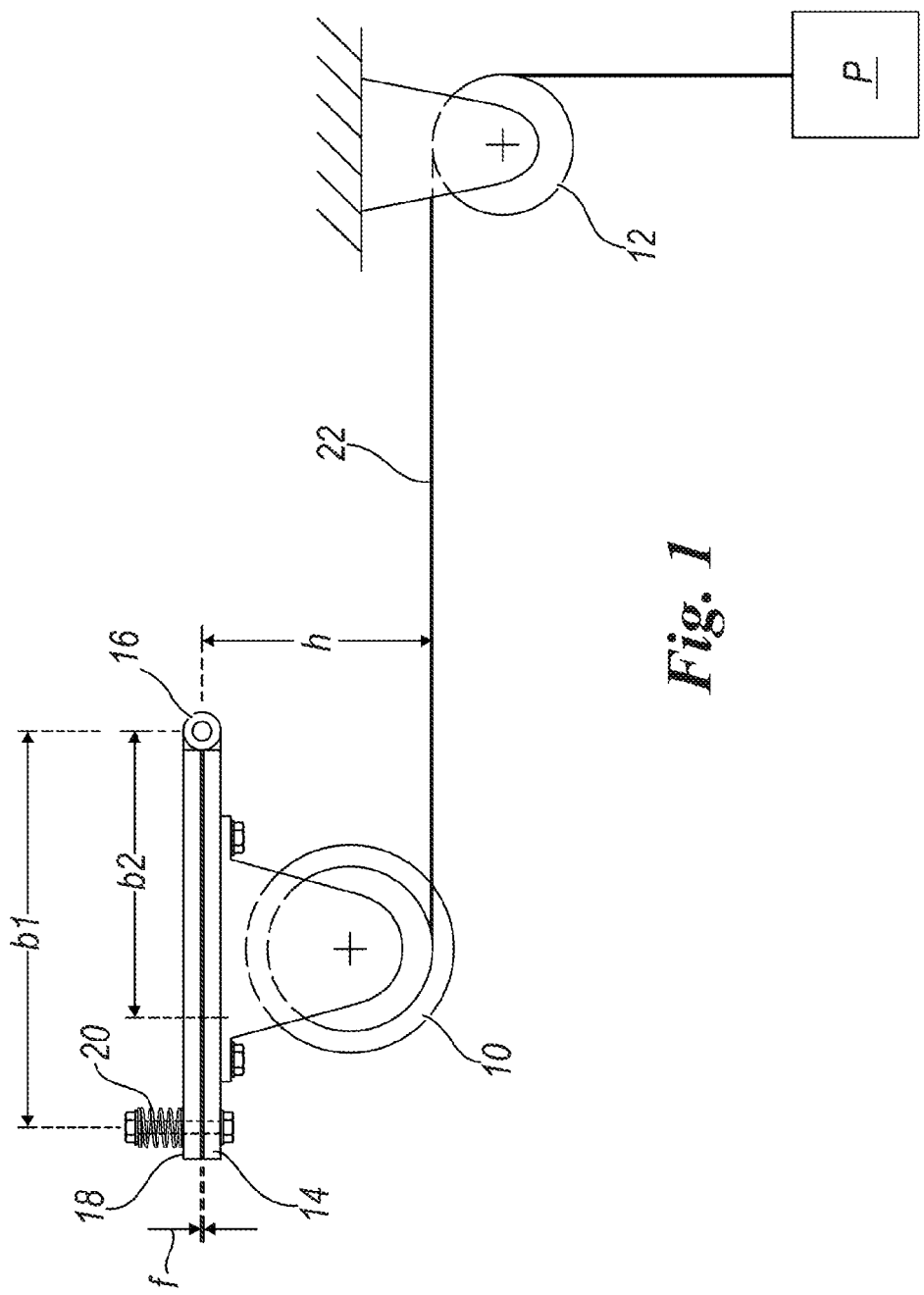
FIG. 1 is a schematic view of a hoist provided with the pull-limiter according to the present innovation.

The schematic view of FIG. 1 allows the main features of the pull-limiter according to the present innovation to be explained in a simple manner. This figure actually shows very schematically a conventional hoist 10 with the relevant snub pulley 12. The hoist 10 is provided with a pull-limiting device 11 comprising a first bearing element 14, in the specific case consisting of a lower steel plate, which is hinged through an edge butt hinge 16 to a second bearing element 18, consisting of an upper plate, also made of steel. When the hoist is in operation, the upper plate 18 is fastened to a support structure, for example a fixed beam or a crane arm (as will be shown below). In the absence of a load P and hence of pull on the rope 22, the two plates 14 and 18 are kept one against the other through pre-loaded elastic means 20 arranged at an appropriate distance (in the specific case the distance $b_1$) from the hinge 16 axis.

When a load P is applied to the free end of the hoist 10 rope 22, the pull exerted by the rope on the hoist originates a moment equaling P×h (FIG. 1) relative to the hinge 16, and said moment acts on the lower plate 14. The rotation of the latter around the hinge 16 axis due to said moment is opposed by an equal and opposite moment due to the reaction of the elastic means 20 arranged at a distance $b_1$ from the hinge 16. However, the reaction of the elastic means 20 allows the lower plate 14 to rotate with respect to the upper plate 18, the rotation being a function of the pull P. In FIG. 1, f designates the rotation angle between the two plates 14 and 18 as a result of the application of the pull P. In the proximity of the side of the two plates 14 and 18 opposing the side wherein the hinge 16 is arranged, conventional means (not illustrated for the sake of simplicity in FIG. 1, but designated by 28 in the following figures) are provided, suitable to detect when the width of the angle f (actually they normally detect the departure of the two plates 14 and 18 from each other in the point where said means are arranged) matches the maximum predetermined pull to be exerted on the hoist, accordingly emitting the relevant signal. Said means can by way of example conveniently consist of a microswitch or, better still, of a (more precise) proximity sensor which switches a duly filtered electric or electronic ON-OFF or proportional signal and forwards it, for example, to an electric appliance, connected to a solenoid valve arranged on the delivery line of the hydraulic circuit of a crane (assuming that the hoist is fastened to a crane arm), which unloads the oil and hence discontinues the hoist lifting action, the only remaining possible movement being to reduce the load since it is too high. Obviously, other devices can be used to achieve the same outcome; likewise obviously, the hoist can alternatively be of an electric type: in this case, its power supply is switched off.

The signal can also be sent as inlet to the "moment limiting" device handling the control of the crane lifting moment as well as of the tilting moment of the relevant vehicle (a device which is obviously missing if the hoist is applied to fixed facilities).

It must be remarked that the elastic means 20 are arranged at a distance $b_1$ (FIG. 1) from the hinge 16, but it can be conveniently provided that they may be alternatively arranged at a second distance $b_2$ (also shown in FIG. 1), even more than two distances being possible. The circumstance that two or more distances or positions are provided allows the position of the elastic means 20 to be changed. This makes it possible to obtain a rotation angle (or a shift of the corresponding points of the two plates) better fitted for the use of said microswitch or proximity sensor. It must however be pointed out that, if so desired and if so needed, the elastic means may be provided in both positions $b_1$ and $b_2$ or, more generally, in a part or all of the provided positions (as will be explained in more details below).

Figure 2:
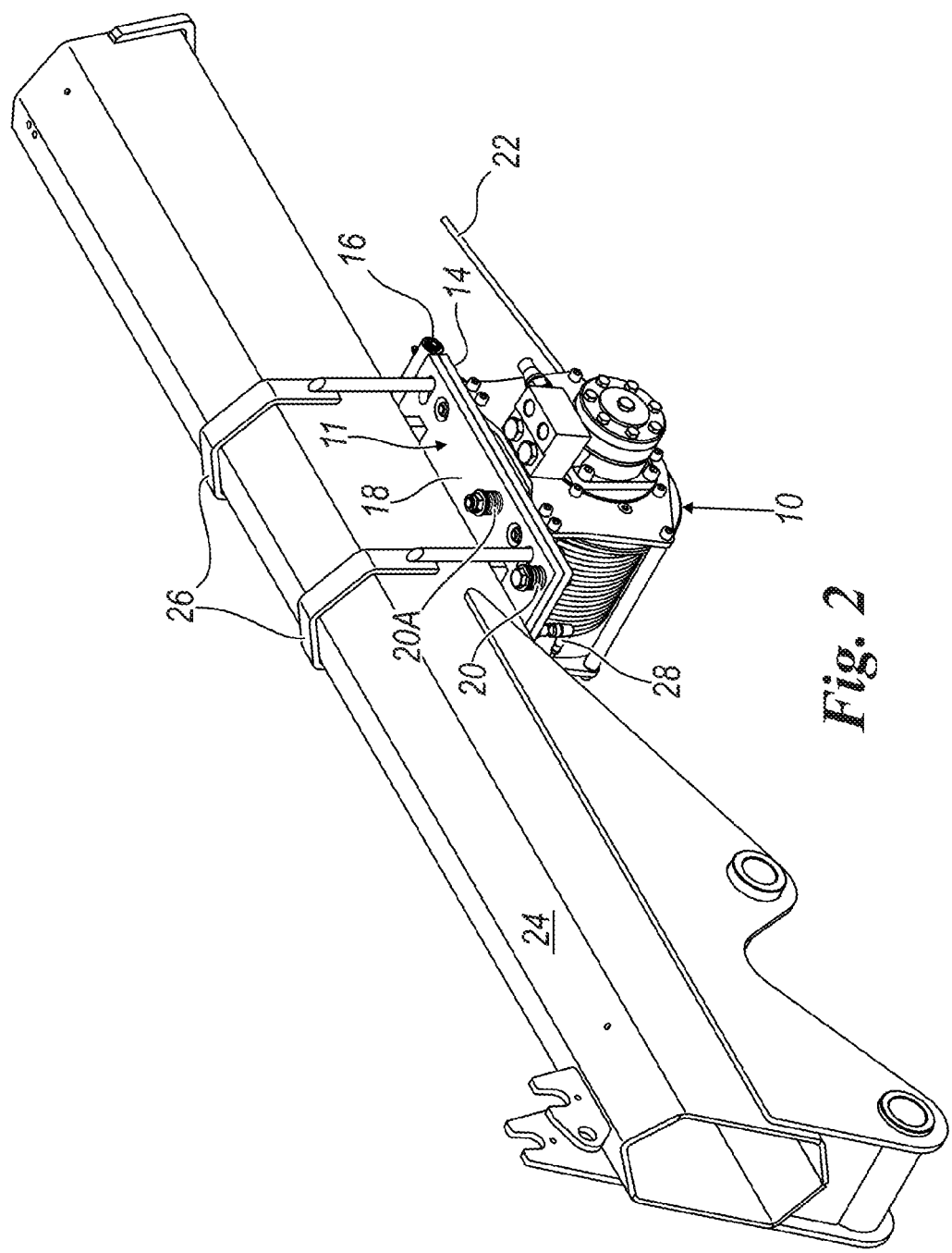
FIG. 2 is a perspective view of a hoist and of the relevant pull-limiter, the hoist being fastened to a crane arm and being provided with the pull-limiter according to the present innovation.

FIG. 2 illustrates the case of a hoist 10 like the one in FIG. 1 fastened to a support structure consisting of a crane arm 24 (although, as already hinted, the support structure can also be fixed). In the specific case, the hoist is fastened by means of conventional braces 26 comprising side ties which engage on the relevant locknuts (not visible in the figures). Since the lower plate 14 must be freely rotating, it is obviously necessary to provide therein some rooms (also not visible) in order to house said locknuts and allow the two plates 14 and 18 to come into contact with each other.

Obviously the hoist 10 may be fastened to the arm 24 in other manners, for example by welding.

In actual fact, since in the instant case the pull-limiting device 11 is provided, the hoist 10 is connected thereto, whereas said device 11 in its turn is directly fastened to the arm 24 (or, more generally, to the bearing structure).

It must be remarked that in FIG. 2 the elastic means are represented both in a position at a distance $b_1$ (with reference to FIG. 1) from the hinge 16 and designated by 20, and in a position at a distance $b_2$ (always with reference to FIG. 1) and designated by 20A. As pointed out, the two positions can be both alternative and, if need be, simultaneous.

The elastic means 20 or 20A in FIG. 2 substantially consist of duly stacked Belleville washers, inserted into the relevant screws and tightened with due pre-load by means of a locknut with bearing washer.

Alternatively, precompressed coil springs having an appropriate diameter can be used.

Figure 3:
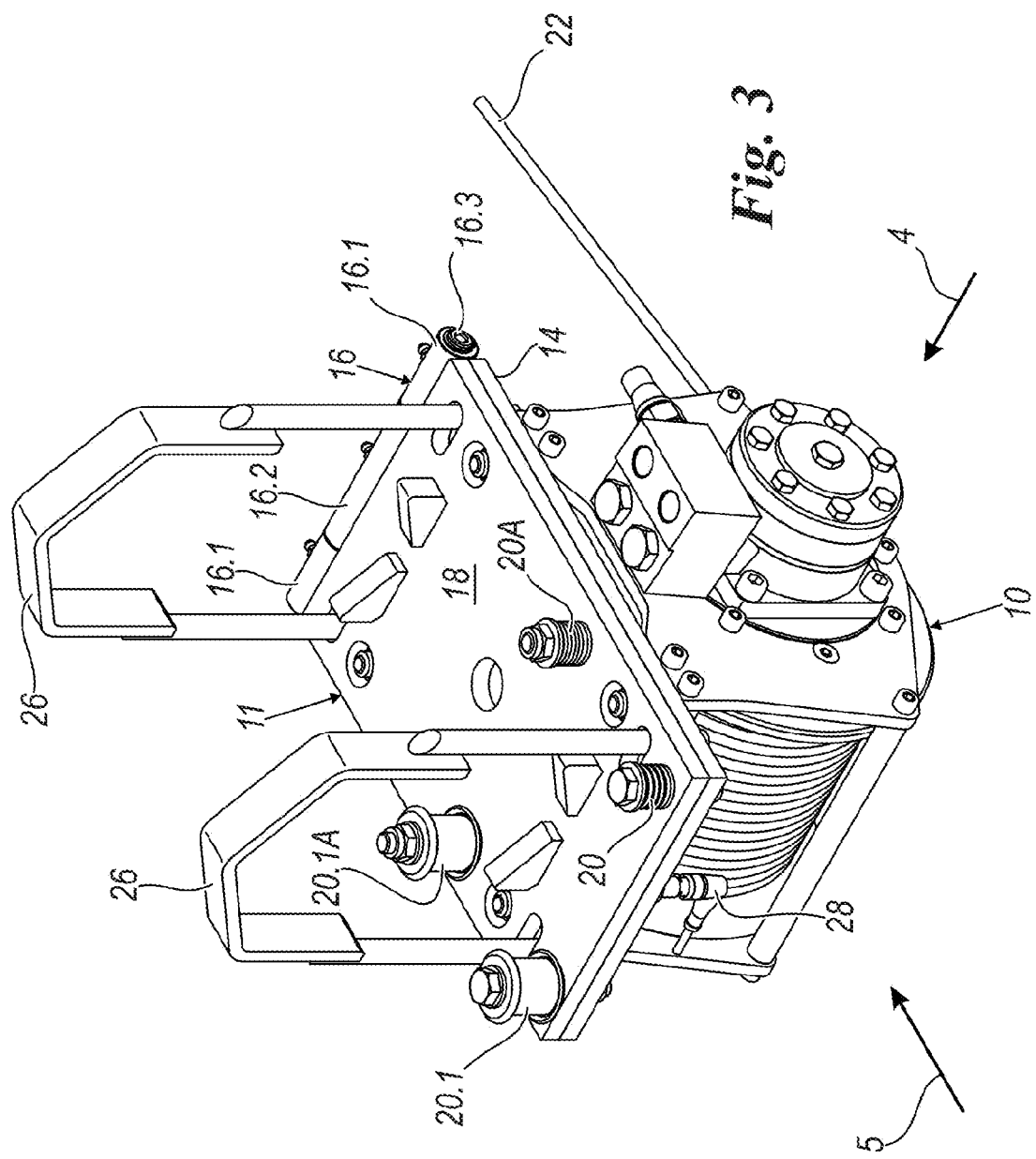
FIG. 3 is an enlarged perspective view, from the same standpoint as FIG. 2, only of the hoist and of the relevant pull-limiter.
Figure 4:
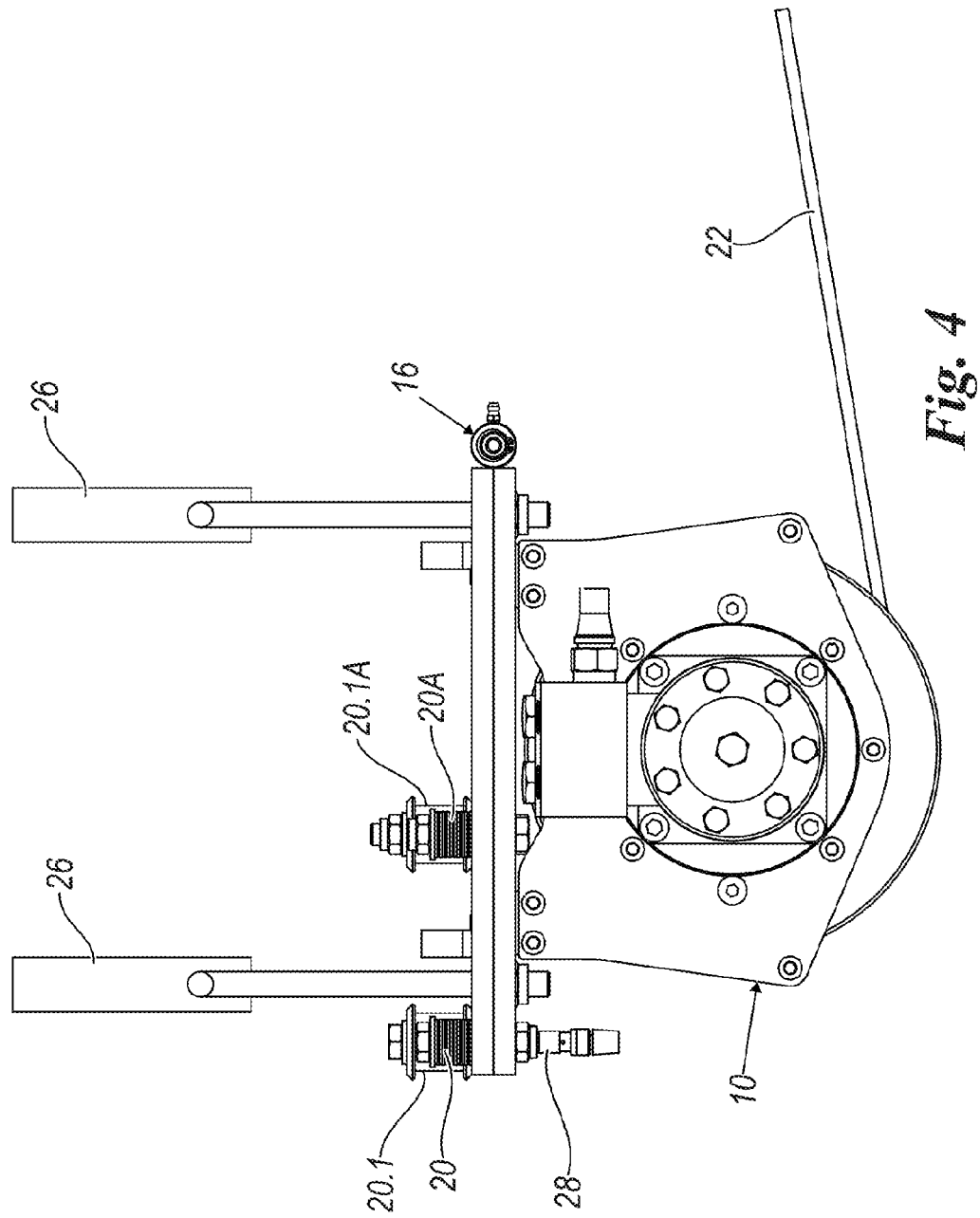
FIG. 4 is an elevated view thereof in the direction of arrow 4 of FIG. 3.
Figure 5:
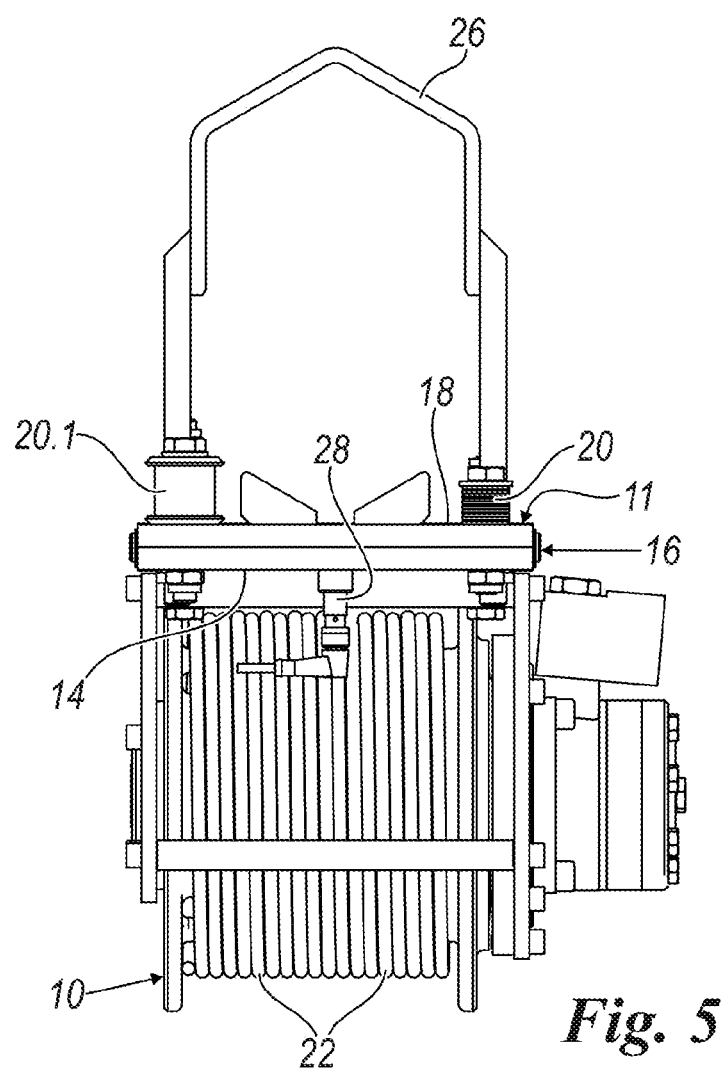
FIG. 5 is an elevated view thereof in the direction of arrow 5 of FIG. 3.

In order to implement the elastic means, it is also possible to use ring-shaped elastomeric elements inserted on screws, with the relevant containment washers and locknut. Elastic means of this latter kind are represented in FIGS. 3-5 and designated by 20.1 and 20.1A, respectively, for the position corresponding to the distance $b_1$ from the hinge 16 and to the alternative distance $b_2$. It must however be clear that with regard to the elastic means said figures are only meant to show that the elastic means can be of a different kind, while it is understood that for the same pull-limiting device all the elastic means must be of the same kind and arranged either in position $b_1$ or in position $b_2$.

FIGS. 2-5 also show the above-mentioned means suitable to detect when the width of the rotation angle of the first bearing element (the plate 14) relative to the second bearing element (the plate 18) matches the maximum predetermined pull exerted on the hoist 10, as well as to emit the relevant signal. Said means are designated by 28 and can be, by way of example, a microswitch or a proximity sensor. Especially in the event that the latter is used, it is convenient to provide the possibility to set its distance from the lower plate 14.

The butt hinge 16 consists in the specific case of three bushings, two 16.1 of which are shorter, side bushings, fastened to one of the two plates 14 and 18, whereas the third 16.2 is a central, longer bushing, fastened to the other plate. The bushings have a very precise diameter relative to the pivot 16.3 of the hinge 16, with as little clearance as possible. The pivot 16.3 is chromium-plated and conventionally held by two elastic rings, one at each of the two ends, or by other securing means.

As can be understood from the foregoing, the pull-limiting device according to the present innovation features several significant benefits compared to similar prior art devices, in particular:

the simplicity of the device and of the implementation thereof, which involve a significantly lower cost than that of the known devices of this kind;

the possibility to remove the end stop of the rope climbing;

its versatility and ease of adjustment as the provided maximum pull varies, due to the possibility to:

a) set the distance of the proximity sensor 28, applied to the upper plate 18, from the lower plate 14;

b) change the tightening of the elastic means 20 or 20A, or else 20.1 or 20.1A, by acting on the relevant nuts;

c) change the distance of said elastic means from the butt hinge 16, since several positions are provided (in the instant case, two different positions $b_1$ and $b_2$) wherein they can be arranged;

d) be able to select several elastic means (in particular elastomers, coil springs or Belleville washers).

The invention claimed is:

1. A pull limiting device for a hoist having a rope associated with the hoist and used in connection with a crane arm, comprising:

a first bearing for attachment to the hoist;

a second bearing for receiving a pull strength acting on the hoist;

a butt hinge connecting the first and the second bearings to each other, a butt hinge axis being substantially perpendicular to a hoisting direction wherein, when a pull acts on the hoist through the rope of the hoist, said axis is at a certain distance from the rope leaving a hoist drum;

one or more springs for opposing rotation of the first bearing away from the second bearing due to the pull acting on the hoist drum, said spring is capable of being arranged in at least two alternative mounting positions having a different distance from the hinge axis of the butt hinge or, when plural springs are present, the springs can be mounted simultaneously having a different distance from the hinge axis of the butt hinge; and a detector for detecting when a rotation angle of the first bearing relative to the second bearing matches a maximum predetermined pull being exerted on the hoist, as well as to emit a signal indicative thereof.

2. A pull limiting device according to claim 1, wherein both the first and the second bearings comprise a metal plate, the two plates lying on planes intersecting in correspondence with the hinge axis of the butt hinge.

3. A pull limiting device according to claim 2, wherein the butt hinge consists of three bushings, two of which are shorter, side bushings, fastened to one of the two plates, whereas the third bushing is a central, longer bushing, fastened to an other plate, the three bushings having a diameter, so as to have minimal clearance relative to the pivot of the hinge, which is chromium-plated.

4. A pull limiting device according to claim 1, wherein the spring or springs comprise coil springs.

5. A pull limiting device according to claim 1, wherein the spring or springs comprise elastomers.

6. A pull limiting device according to claim 1, wherein the spring or springs comprise Belleville washers.

7. A pull limiting device according to claim 1, wherein the detector comprises a proximity sensor or microswitch.

8. A pull limiting device according to claim 1, wherein the second bearing is connected to the crane arm.

9. A pull limiting device for a hoist having a rope associated with the hoist and used in connection with a crane arm, comprising:

a first bearing for attachment to the hoist;

a second bearing for receiving a pull strength acting on the hoist;

a butt hinge connecting the first and the second bearings to each other, a butt hinge axis being substantially perpendicular to a hoisting direction wherein, when a pull acts on the hoist through the rope of the hoist, said axis is at a certain distance from the rope leaving the hoist drum;

a first spring for opposing rotation of the first bearing away from the second bearing due to the pull acting on the hoist drum, said first spring capable of being arranged alternatively in first or second mounting positions having a different distance from the hinge axis of the butt hinge; and a detector for detecting when a rotation angle of the first bearing relative to the second bearing matches a maximum predetermined pull being exerted on the hoist, as well as to emit a signal indicative thereof.

10. The pull limiting device of claim 9, further including a second spring for positioning at the second mounting position when the first mounting spring is positioned at the first position.

11. The pull limiting device of claim 9, wherein the first spring comprises a coil spring.

12. The pull limiting device of claim 9, wherein the first spring comprises a Belleville washer.

13. A pull limiting device for a hoist, comprising:
a first bearing element to which the hoist is fastened;
a second bearing element fastened to a bearing structure on which a pull strength acting on the hoist is unloaded;
a butt hinge connecting the first and the second bearing element to each other, a hinge axis being substantially perpendicular to a hoisting direction wherein, through a rope of the hoist, the pull acts on the hoist, said axis being at a certain distance from the rope leaving a hoist drum;
elastic means suitable to oppose a rotation of the first bearing element away from the second bearing element due to the pull acting on the hoist drum, said elastic means capable of being arranged in at least two alternative or simultaneous positions having a different distance from the hinge axis of the butt hinge;

means suitable to detect when a width of a rotation angle of the first bearing element relative to the second bearing element matches a maximum predetermined pull which is being exerted on the hoist, as well as to emit a relevant signal.

14. The pull limiting device according to claim 13, wherein both the first and the second bearing element comprise a metal plate, the two plates lying on planes intersecting in correspondence with the hinge axis of the butt hinge.

15. The pull limiting device according to claim 13, wherein the elastic means comprise coil springs.

16. The pull limiting device according to claim 13, wherein the elastic means comprise elastomeric elements.

17. The pull limiting device according to claim 13, wherein the elastic means comprise Belleville washers.

18. The pull limiting device according to claim 13, wherein the means to emit a signal comprises a proximity sensor or microswitch.

19. The pull limiting device according to claim 13, wherein the butt hinge comprises three bushings, two of which are shorter, side bushings, fastened to one of the two plates, whereas the third bushing is a central, longer bushing, fastened to an other plate, the three bushings having a diameter, so as to have minimal clearance relative to a pivot of the hinge, which is chromium-plated.

20. The pull limiting device according to claim 13, wherein the bearing structure is a crane arm.

* * * * *

UNITED STATES PATENT AND TRADEMARK OFFICE
CERTIFICATE OF CORRECTION

| | |
|---|---|
| PATENT NO. | : 9,527,702 B2 |
| APPLICATION NO. | : 14/261796 |
| DATED | : December 27, 2016 |
| INVENTOR(S) | : Stello Agazzi |

Page 1 of 1

It is certified that error appears in the above-identified patent and that said Letters Patent is hereby corrected as shown below:

In the Claims

Claim 10, Column 5, Line 10, delete "mounting".

Claim 10, Column 5, Line 11, after "first", insert -- mounting --.

Signed and Sealed this
Twenty-seventh Day of February, 2018

Andrei Iancu
*Director of the United States Patent and Trademark Office*